United States Patent [19]
Williams et al.

[11] Patent Number: 6,029,251
[45] Date of Patent: *Feb. 22, 2000

[54] METHOD AND APPARATUS FOR TEMPERATURE SENSING

[75] Inventors: Mark Williams; Loi Tran, both of San Jose, Calif.

[73] Assignee: OPTi Inc., Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/777,789

[22] Filed: Dec. 31, 1996

[51] Int. Cl.$^7$ ............................................. G06F 1/08
[52] U.S. Cl. .................................. 713/501; 713/601
[58] Field of Search ............................ 395/555, 556, 395/558, 559, 560; 364/557; 377/25; 702/130, 132; 713/601, 500, 501, 503, 600, 322

[56] References Cited

U.S. PATENT DOCUMENTS

| | | | |
|---|---|---|---|
| 4,480,312 | 10/1984 | Wingate | 364/557 |
| 5,277,495 | 1/1994 | Forehand | 374/183 |
| 5,451,892 | 9/1995 | Bailey | 327/113 |
| 5,469,561 | 11/1995 | Takeda | 395/550 |
| 5,483,102 | 1/1996 | Neal et al. | 257/712 |
| 5,490,059 | 2/1996 | Mahalingaiah et al. | 364/166 |
| 5,798,918 | 8/1998 | Georgiou et al. | 364/148 |
| 5,842,005 | 11/1998 | Walsh et al. | 713/601 |
| 5,940,785 | 8/1999 | Georgiou et al. | 702/132 |

*Primary Examiner*—Dennis M. Butler
*Attorney, Agent, or Firm*—Fliesler, Dubb, Meyer & Lovejoy LLP

[57] ABSTRACT

A temperature sensing apparatus is disclosed which generates a signal having a frequency which is related to temperature. The apparatus includes means for receiving a temperature input, an output for carrying an output signal having a frequency related to the temperature output, and a converting means for converting the temperature input to the output signal.

14 Claims, 3 Drawing Sheets

METHOD AND APPARATUS FOR TEMPERATURE SENSING

BACKGROUND OF THE INVENTION

1. Field of the Invention

The invention relates to temperature sensing in a computer system.

2. Background Art

The IBM PC AT computer architecture has become industry standard architecture for personal computers, and is typically built around a CPU such as an 80286, 80386, 80486, or 80586 (Pentium®) microprocessor manufactured by Intel Corporation. The CPU is coupled to a host (local) bus, capable of performing memory accesses and data transfers at high rates of speed (i.e., on the order of 10–66 MHz). The host bus generally includes 16, 32, or 64 data lines, a plurality of address lines, and various control lines. For present purposes the following signals on the host bus are important:

| Signal Name | Signal Description |
| --- | --- |
| HD[63:0] | Host Bus Data Lines. |
| HA[31:3] | Host Bus Address Lines. |
| BE[7:0]# | Byte enables 7 through 0: Selects the active byte lanes on HD[63:0]. |
| INTR | Interrupt Request: INTR is driven to signal the processor that an interrupt request is pending and needs to be serviced. |
| M/IO# | Memory/Input-Output: M/IO#, defines processor bus cycles along with D/C#, and W/R#. |
| D/C# | Data/Control: D/C# defines processor bus cycles along with M/IO# and W/R#. |
| W/R# | Write/Read: W/R# defines processor bus cycles along with M/IO# and D/C#. |
| ADS# | Address Strobe: The processor asserts ADS# to indicate that a new bus cycle is beginning |
| BRDY# | Burst Ready: BRDY# indicates that the system has responded in one of three ways: 1) Valid data has been placed on the processor data bus in a response to a read, 2) Processor write data has been accepted by the system, or 3) the system has responded to a special cycle. |
| STPCLK# | Stop Clock: this signal is connected to the STPCLK# input of the processor. It causes the processor to get into the STPGNT# state. |

The typical IBM PC AT-compatible computer also includes a system bus, sometimes referred to as an I/O bus. Such a system bus is used to interface communications between a host processor and a peripheral device, or communications between peripheral devices and host memory. The system bus is coupled to the host bus via certain interface circuitry. The system bus includes generally 8, 16, or 32 data lines, a plurality of address lines, as well as control lines. Commonly used system buses include the industry standard architecture (ISA) bus and the PCI bus.

Other computer system circuitry is dedicated to monitor the temperature of the system, particularly near the host processor, and to take some sort of corrective action when the system begins to overheat. To perform thermal management functions conventionally, a thermistor is positioned near the host processor. The analog signal generated from the thermistor is representative of temperature and is sent to an analog-to-digital (A/D) converter, which converts the analog temperature information into digital information, often a 12-bit value. Sometimes, the A/D converter is incorporated into a keyboard controller (KBC) because of extra inputs usually available on a KBC. The 12-bit digital value is then compared to a threshold value, and when the measured temperature reaches or surpasses the threshold, a signal is sent to the host processor indicating an overtemperature condition. The host processor then executes various routines and either slows or stops its operations. These routines often entail reprogramming various registers to slow the CPU clock rate or cutting off all power to the host processor.

Generally, there are two problems with conventional thermistor-A/D schemes. First, A/D converters tend to be expensive, driving computer system prices upward. Second, the response of the host processor to an overtemperature signal is not always reliable: despite an overtemperature signal, if the processor is not operating properly, it is never certain that appropriate action, e.g., reprogramming registers, will be undertaken to prevent the processor from irreparable damage. Therefore, more reliable, less expensive temperature sensing and notifying means is desired.

SUMMARY OF INVENTION

In accordance with the invention a more reliable and less expensive temperature sensing apparatus is disclosed. The apparatus comprises means for receiving a temperature input, an output for carrying an output signal having a frequency related to said temperature input, and converting means for converting said temperature input to said output signal.

In one embodiment, such a sensor utilizes a temperature sensitive current source to receive temperature information and generate an output current relating to the temperature. The output current is used to generate a voltage which is received by a voltage controlled oscillator (VCO). The VCO generates a signal having a frequency related to the voltage.

Further, in accordance with the invention, the output frequency of the temperature sensing apparatus is monitored external to the processor. When the frequency reaches a threshold value, a signal is generated to modulate processor operations.

A system in accordance with the invention is advantageous in that less expensive parts can be utilized.

A system in accordance with the invention is further advantageous in that no microprocessor instructions are required.

A system in accordance with the invention is further advantageous in that it can be implemented in a fail-safe mode of operation, reliably handling an overtemperature or system failure condition, even when the processor responds to signals inappropriately as a result of the overtemperature or system failure condition.

BRIEF DESCRIPTION OF THE FIGURES

The present invention is described with respect to particular exemplary embodiments thereof and reference is accordingly made to the drawings (which are not necessarily drawn to scale), wherein like reference numbers denote like parts, in which.

DETAILED DESCRIPTION

Figure 1:
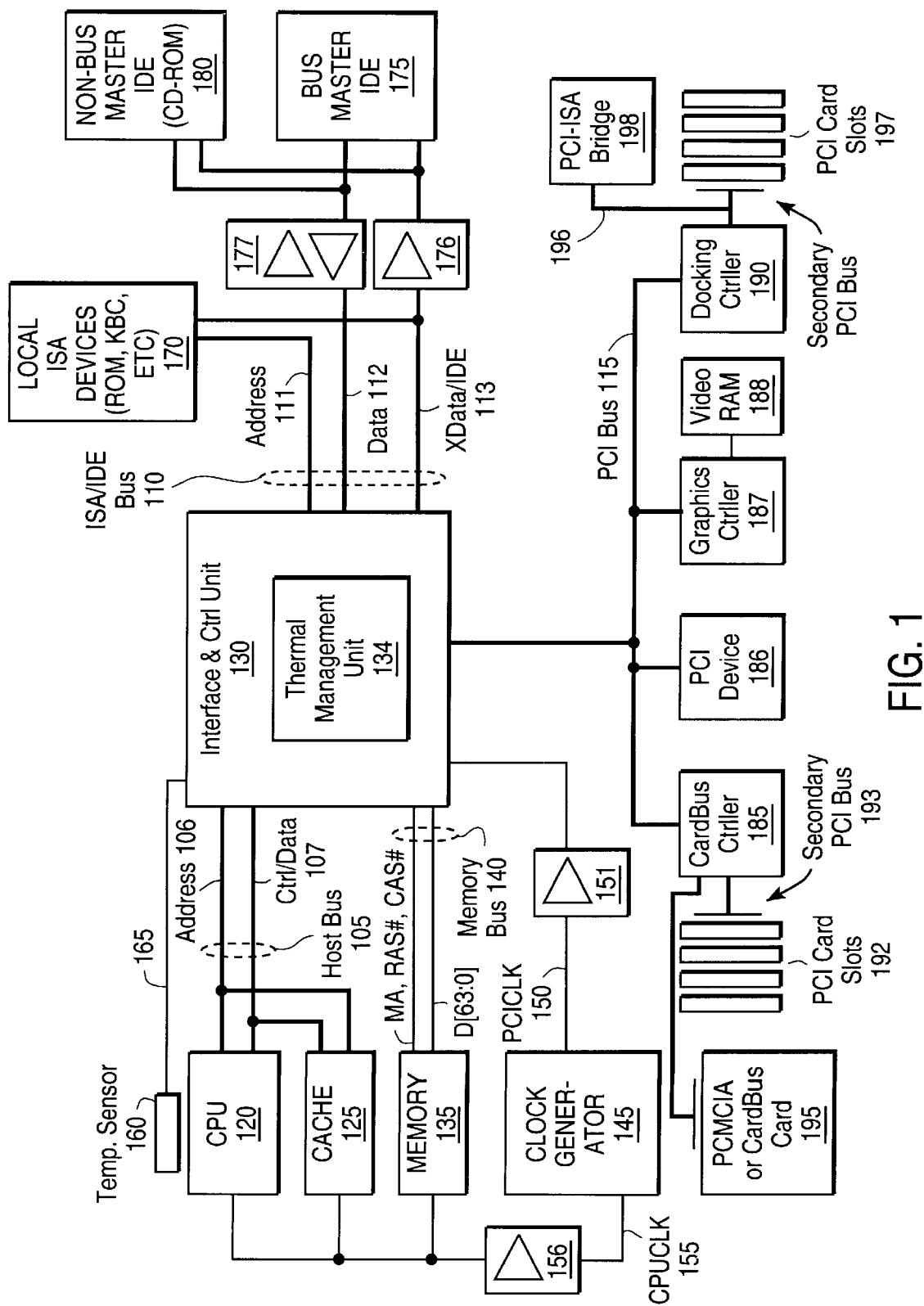
FIG. 1 is a schematic block diagram of a system which utilizes an embodiment of the invention.

A system 100 which may incorporate the present invention is shown in FIG. 1. It comprises a host bus 105, an ISA bus 110, and a primary PCI bus 115.

The host bus 105 includes address lines 106 and control/data/status lines 107. The ISA bus 110 includes address lines 111, 16-bit data lines 112, X data lines 113, as well as various control lines (not shown). The primary PCI bus 115, includes address, data and control/status lines.

A processor 120 (such as Intel's 80586 Pentium®) is coupled to address, data and control/status lines of host bus 105. The address and control/status lines of host bus 105 is further coupled to cache memory 125. Cache memory 125 may be synchronous L2 (level 2) cache in one embodiment.

Host bus 105 is further coupled to interface and control unit 130. Interface and control unit 130 includes thermal management unit 134. In one embodiment, interface and control unit 130 is a chipset.

Interface and control unit 130 is coupled to memory unit 135 via memory bus 140 which provides memory address, RAS#, CAS#, and data information between interface and control unit 130 and memory unit 135. Memory unit 135 may be composed of EDO or synchronous DRAM in various embodiments.

Clock generator unit 145 provides a PCI clock signal (PCICLK) on line 150 via buffer 151 to interface and control unit 130. Clock generator unit 145 further provides a CPU clock signal (CPUCLK) on line 155 via buffer 156 to memory unit 135, if synchronous DRAM is used, and to processor 120.

Temperature sensor circuit 160 is coupled to interface and control unit 130 via line 165.

Several devices are coupled to interface and control unit 130 via ISA bus 110. These devices include local ISA devices 170, such as BIOS ROM, keyboard controller (KBC), etc. Further, bus mastering IDE devices 175 as well as non-bus mastering IDE devices 180 (such as CD-ROM) are coupled to interface and control unit 130 via ISA bus 110, buffer 176 and bidirectional transceiver 177.

PCI bus 115 is also coupled to interface and control unit 130. Several devices are coupled to PCI bus 115, including a card bus controller 185, which may be an 82C824 produced by OPTi, Inc. of Milpitas, Calif., a graphics controller 187, which may be a 92C178, produced by OPTi, Inc., and a docking controller 190, which may be an 82C814 produced by OPTi, Inc. Coupled to graphics controller 187 is video RAM card 188. Other PCI devices 186, such as a PCI-based super I/O unit, may also be coupled to PCI bus 115 in various embodiments.

CardBus controller 185 acts as a bridge to secondary PCI bus 193. Secondary PCI bus 193 couples additional PCI slots 192 to the system. Additionally, CardBus controller 185 can also be coupled via line 194 to a PCMCIA or other CardBus card 195.

In like manner, docking controller 190 is coupled to a secondary PCI bus 196, which couples additional PCI slots 197 to the system. Further, docking controller 190 may further be coupled to a PCI-to-ISA bridge 198 in one embodiment of the invention.

In computer systems, if the temperature of the system is too high, damage may occur to system circuitry, and in particular the CPU or other processor. Many devices use a thermistor coupled to an A/D converter, which in turn is coupled to circuitry which will send a signal to the processor indicating an overtemperature condition. The processor must then take action (i.e., must execute instructions) to stop or slow its performance. Unfortunately, A/D converters tend to be expensive, and the processor reaction to an overtemperature condition signal is not always reliable.

Thus, in accordance with the invention, a temperature sensing circuit is implemented which is not only less expensive than the conventional A/D converter methodology, but does not require microprocessor instruction and can be implemented in a "fail safe" mode, reliably indicating and responding to an overtemperature condition or circuit failure.

To implement its temperature sensing system, one embodiment of the invention takes advantage of the STPCLK# feature on various Pentium® and other processors (including Intel's 610/75, 73590, 815/100, 1000/120, 1110/133) (Pentium is a registered trademark of Intel Corp.). STPCLK# provides a signalling mechanism that allows external system hardware to control the power consumption of the processor by stopping the internal clock to the processor core in a controlled manner. Each of these Pentium processors contains a phase-locked loop (PLL) frequency generator that takes the external clock frequency input and multiplies it before applying it to the processor core. By asserting the STPCLK# signal, the processor core may be cut off from the PLL output without any loss of information. After receipt of STPCLK#, the processor then enters a Stop Grant state in which processor power consumption is approximately 15–20% of the normal consumption. Processor internal clocking may be restarted almost immediately by negating the STPCLK# signal. Thus, when there is no significant activity, various interface circuitry can use the STPCLK# signal to achieve significant power savings.

Figure 2:
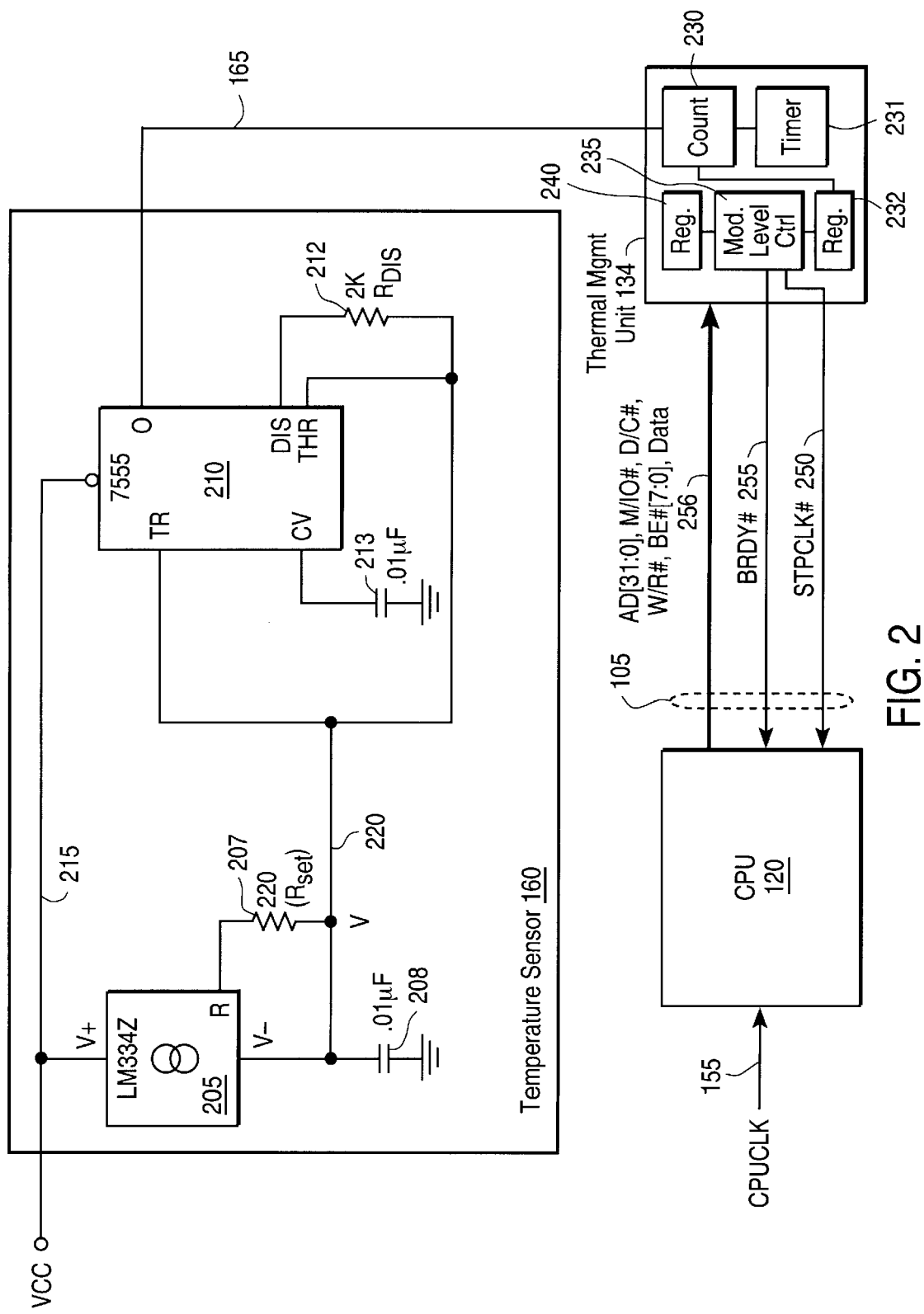
FIG. 2 is a schematic block diagram of a first embodiment in accordance with the invention.

Referring to FIG. 2, upon receipt of an active STPCLK# signal 250, the processor 120 generates a special bus cycle referred to as a Stop Grant cycle. The Stop Grant cycle consists of the assertion by the processor 120 of the following signal states on host bus 105: M/IO#=0, D/C#=0, W/R#=1, Address lines=0000 0010hex, BE#[7:0]=1111 1011, and data lines are undefined (floating). The system hardware external to the processor must acknowledge the Stop Grant cycle by returning a BRDY# signal 255. Upon receipt of BRDY# 255 the processor 120 enters the Stop Grant state, in which the processor 120 is in a low power mode, awaiting deassertion of the STPCLK# signal 250. More specific details of the Stop Grant state and the processor's response to a STPCLK# signal can be found in the 1995 Pentium Processor Family Developer's Manual, Vol. 1 (available from Intel Corp. Literature Center, P.O. Box 7641, Mt. Prospect, Il. 60056-7641), incorporated herein by reference.

An embodiment of the present invention can make use of the STPCLK# feature of Pentium® and similar processors by periodically asserting and deasserting the STPCLK# signal 250 to effectively slow the processor 120, which itself does not generally provide much control for changing the frequency of its input clock 155. Such periodic assertion and deassertion of the STPCLK# signal 250 can significantly reduce processor power consumption and is referred to herein as "STPCLK# modulation". STPCLK# modulation can be invoked by software, firmware, or hardware.

In one embodiment of the present invention, the STPCLK# signal 250 is modulated using a base frequency of 32

Khz, which can be programmably varied to possess any of a wide range of duty cycles. The cycle that is used to modulate the STPCLK# signal lasts 31.25 μs (1/32 Khz). The time for which STPCLK# is asserted is defined as tlowl and the time for which it is not asserted is defined as $t_{hi}$. The sum of $t_{hi}$ and ttow equals 31.25 μs. In every 32 Khz cycle the STPCLK# signal is asserted for 31.25 μs$-t_{hi}$. Different levels of modulation can be achieved by varying the duty cycle of the STPCLK# signal, for instance, by programming and/or reprogramming $t_{hi}$ or ttoW in a register. Of course, other embodiments of the invention could implement STPCLK# modulation with a different base frequency than 32 Khz.

Thus, to implement STPCLK# modulation, one embodiment of the present invention first asserts STPCLK# 250 and waits for a Stop Grant cycle to be initiated by the processor 120. Next, BRDY# on line 255 is asserted and received by the processor 120. After waiting for a time period of $t_{low}$ (31.25 μs$-t_{hi}$), STPCLK# 250 is deasserted. After waiting for $t_{hi}$ (during which time the processor operates normally), STPCLK# 250 is again asserted and the process repeats. In FIG. 2, a temperature sensor assembly 160 in accordance with the invention is shown. The temperature sensor assembly 160 uses two basic parts: a temperature sensitive current source (TSCS) 205 and a voltage controlled oscillator (VCO) 210. The TSCS 205 produces a current which is directly proportional to absolute temperature (° K). In one embodiment of the invention, the TSCS used is an LM344z produced by National Semiconductor, Inc. The TSCS output current, $I_{set}$, is conditioned by an external resistor, $R_{set}$ 207 and is defined by the following formula:

$$I_{set} = \frac{227 \mu V}{R_{set}} \cdot T_k$$

where $T_K$ is temperature in ° K, or $$I_{set} = \frac{227 \mu V}{R_{set}} \cdot (273 + T_c)$$

where $T_c$ is temperature in ° C. The output current is used to generate an output voltage V which will also be directly proportional to temperature.

The temperature dependent output voltage is received via line 220 into VCO 210 which converts the voltage received on line 220 into a signal having a proportionally related frequency, which signal is output on line 165. In one embodiment of the invention, VCO 210 is a 7555 available from National Semiconductor, Inc. The 7555 is a CMOS device.

The output signal on line 165 has a frequency conditioned by resistors and capacitors. Specifically, in FIG. 2, the output frequency generated on line 165 will depend on the current output ($I_{set}$) from the TSCS 205, Vcc (supplied on line 215 to each of the TSCS 205 and VCO 210), $R_{dis}$ 212, and capacitor (C) 208. The output frequency duty cycle is defined by the sum of the charge time ($t_{ch}$) and the discharge time ($t_{dis}$), where $$t_{ch} = \frac{C \cdot Vcc}{3 \cdot I_{ch}}$$

and $$t_{dis} = 0.695 \cdot R_{dis} \cdot C.$$

Thus the output frequency for the embodiment of the invention of FIG. 2 is $(1/(t_{ch}+t_{dis}))$ or $$f = \frac{3}{C} \cdot \left[ \frac{I_{ch}}{Vcc + 2.085 \cdot R_{dis} \cdot I_{ch}} \right].$$

In the embodiment of FIG. 2, $I_{ch}=I_{set}$. If C is set to 0.01 μf, Vcc=5 v, $R_{set}$=220 ohm, and $R_{dis}$=2 k, then the output frequency is:

$$f = 300 \cdot \frac{61971 + (227 \cdot T_c)}{1359.35 + (0.95 \cdot T_c)}$$

$$T_c = \frac{(1359.35 \cdot f) - 18591300}{681000 - (0.95 \cdot f)}$$

Figure 3:
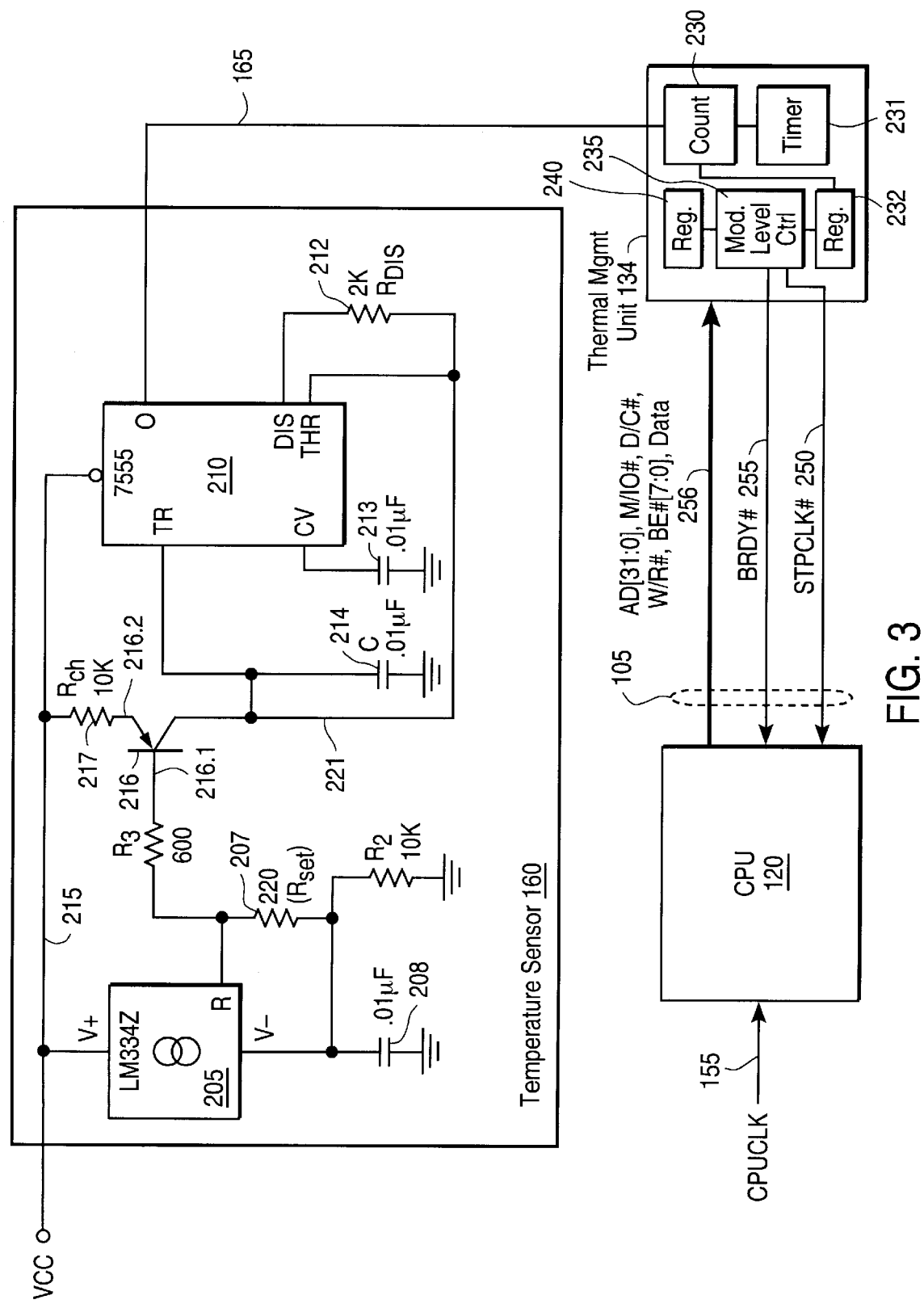
FIG. 3 is a schematic block diagram of a second embodiment in accordance with the invention.

A second embodiment of the invention shown in FIG. 3, produces a frequency output from temperature sensor assembly 160 which is inversely proportional to temperature. The embodiment of FIG. 3, uses TSCS 205 and VCO 210, as in the embodiment of FIG. 2, but additionally utilizes transistor 216. In one embodiment transistor 216 is a 2N3906 bipolar pnp transistor available from National Semiconductor. Transistor 216 acts as a current source which is controlled by the output voltage of TSCS 205. The current output from transistor 216 depends on the voltage at its base 216.1 (or $V_{out}$ from TSCS 205), Vcc and $R_{ch}$ 217, the resistor coupled to emitter 216.2 of transistor 216. The current output of transistor 216 on line 221 is:

$$I_{ch} = \frac{(V_{cc} - V_{be} - V_{out})}{R_{ch}}$$

where $V_{be}$ is the potential difference between base 216.1 and emitter 216.2. VCO 210 will thus output a frequency based on the equation:

$$f = \frac{3}{C} \left[ \frac{V_{cc} - V_{be}}{R_{ch}} - \frac{(R_{out} \cdot 227 \mu V)(273 + T_c)}{R_{ch} \cdot R_{set}} \right] \cdot$$

$$\left[ \frac{1}{V_{cc} + 2.085 R_{dis} \left[ \frac{V_{cc} - V_{be}}{R_{ch}} - \frac{(R_{out} \cdot 227)(273 + T_c)}{R_{ch} \cdot R_{set}} \right]} \right]$$

In FIG. 3, C is capacitor 214. If C=0.01 μf, $V_{cc}$=5 V, $V_{be}$=0.7 V, $R_{ch}=R_{out}$=10k, $R_{dis}$=2k, $R_{set}$=220 ohm, then $$f = 300 \cdot \frac{148.300 - (1.032 \cdot T_c)}{5.618 - (0.0043 \cdot T_c)}$$

and $$T_c = \frac{(300 \cdot 148.300) - (5.618 \cdot f)}{300 \cdot 1.032 - (0.0043 \cdot f)}$$

If either a directly proportional temperature-to-frequency generator is used or an inversely proportional temperature-to-frequency generator is used, the temperature sensor assembly 160 in one embodiment is placed near the processor 120. Other embodiments may only place sensor 205 near the processor. Generally, however, the TSCS 205 senses the processor 120 temperature, and thus should be placed either touching the processor (within a couple of millimeters) or on a heat sink connected to the processor 120. Other embodiments of the invention may monitor the temperature of a device other than a processor, and thus the TSCS 205 placement should be adjusted accordingly.

In embodiments using either a directly proportional temperature-to-frequency generator or an inversely proportional temperature-to-frequency generator, the VCO 210 outputs a signal on line 165 having a frequency related to the processor temperature (directly or inversely proportional). Output signal on line 165 from VCO 210 is input into thermal management unit 134. Thermal management unit 134 monitors the frequency of the signal on line 165, for instance with counter circuitry where the output count is sampled once every second. Because the frequency will vary proportionally with temperature, when the frequency hits a certain threshold frequency, a signal, e.g., STPCLK#, is sent to the processor 120 by thermal management unit 134.

As discussed above, in the present embodiment, the STPCLK# signal is used to throttle, or slow down, the processor. The thermal management unit of the present invention determines what level of STPCLK# modulation should be utilized. If the frequency (f) of the signal received on line 165 is in a range of between zero and a predetermined low frequency (lofreq) (0<f<lofreq) then no STPCLK# signal is asserted to the processor (i.e., no STPCLK# modulation occurs). If f is between lofreq and a predetermined high frequency (hifreq) (lofreq<currfreq<hifreq), then the STPCLK# signal is periodically asserted and deasserted at a first STPCLK# modulation level. If f is greater than hifreq (f>hifreq) then STPCLK# is periodically asserted more frequently to STPCLK# modulate at a second, higher level of modulation (i.e., further slow the processor). Each of hifreq and lofreq can be programmed and/or reprogrammed into registers in one embodiment of the present invention.

As shown in FIGS. 2 and 3, thermal management unit 134 includes, in one embodiment, a counter 230, a modulation level controller 235, an interval timer 231, a read back register 232, and a modulation register 240. Counter 230 receives the signal on line 165 as an input. Once every second, interval timer 231 signals the counter 230 to transfer the count to read back register 232 and then to clear the count in counter 230. Modulation level controller 235 compares the count stored in read back register 232 to lofreq and/or hifreq, which are stored in modulation register 240, and then asserts STPCLK# as appropriate.

The devices as shown in FIGS. 2 and 3 also can reliably react to an overtemperature condition, even when the overtemperature condition is causing other devices in the system to behave unreliably. When temperature is inversely proportional to frequency, i.e., where frequency decreases as temperature increases, the frequency will drop toward zero as the temperature rises. Thus, even if the circuit fails, a zero or very low frequency will indicate the highest degree of STPCLK# modulation.

Where frequency varies proportionally to temperature, i.e., as frequency increases as temperature increases, frequency is again monitored for a zero frequency condition. In a normally functioning system, the frequency will generally be significantly higher than zero. Thus, any time a frequency of zero is input into thermal management unit 134, an overtemperature or malfunction condition will be recognized, and STPCLK# modulation will occur. Further, because STPCLK# modulation levels are determined in thermal management unit 134, away from the processor, even if the processor fails, the STPCLK# function is still likely to work.

Thus a temperature sensing device has been disclosed which is both simple and inexpensive. The temperature sensing device converts temperature information into frequency information, which can then be easily monitored for various temperature conditions. Further, as described, the device of the present invention reliably notifies and takes action consistent with the temperature information received. Moreover, no microprocessor code is required to analyze and react to an overtemperature condition.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A temperature sensing system for monitoring the temperature of a processor having a clock and for modulating processor operations when an overtemperature condition is detected, comprising:

a temperature sensor, having means for receiving a temperature input and an output for carrying a sensor output signal, said sensor output signal having a frequency related to said temperature input; and modulation means, external to said processor and operatively coupled to receive said sensor output signal and having a modulation output operatively coupled to said processor, for monitoring said frequency, for detecting, based on said frequency, whether an overtemperature condition has occurred, and for periodically asserting and deasserting a modulation signal, independent of said clock, on said modulation output for controlling said processor clock, thereby controlling the temperature of said processor.

2. The temperature sensing system of claim 1, wherein said temperature sensor includes:

a temperature sensitive current source, having an output for carrying a current;

current converting means for generating a voltage from the current; and a voltage controlled oscillator operatively coupled to receive said voltage and having a VCO output for carrying said sensor output signal.

3. The temperature sensing system of claim 1, wherein said modulation means includes:

a counter, operatively coupled to receive said sensor output signal, said counter for producing a count value;

storage means for storing a frequency threshold value; and comparison means, for comparing said counter value to said frequency threshold value.

4. The temperature sensing system of claim 3, wherein said storage means is a programmable register.

5. The temperature sensing system of claim 1, wherein said modulation signal is a STPCLK# signal and wherein said modulation means is for asserting said STPCLK# signal on said modulation output when said frequency reaches a frequency threshold value, indicating an overtemperature condition.

6. The temperature sensing system of claim 5, wherein said modulation means is further for operating in a fail safe mode when a system failure condition is present.

7. The temperature sensing system of claim 6, wherein said system failure condition is a zero frequency and wherein said fail safe mode includes asserting said STPCLK# signal.

8. An apparatus for monitoring the temperature of a processor and for modulating processor operations when an overtemperature condition is detected, comprising:

a temperature-to-frequency converter, having an output; and a thermal management unit in communication with said temperature-to-frequency converter and said processor, said thermal management unit external to said processor and including:
  a frequency monitor in communication with said temperature-to-frequency converter output, said frequency monitor having an output and structured to produce a frequency value after a predetermined time period;
  a comparator, having a first input in communication with said frequency monitor output and a second input for carrying a threshold frequency value, said comparator having a modulation output in communication with said processor, said comparator structured to periodically assert and deassert a signal on said modulation output indicative of whether said frequency value is at least said threshold frequency value.

9. The apparatus of claim 8, wherein said temperature-to-frequency converter includes:
  a voltage controlled oscillator; and
  a temperature-to-voltage converter.

10. The apparatus of claim 8, wherein said thermal management unit further includes:
  a register coupled to said second input of said comparator, said register storing said threshold frequency value.

11. The apparatus of claim 10, wherein said frequency monitor includes:
  a counter; and
  a timer coupled to said counter.

12. The apparatus of claim 8, wherein said signal carried on said modulation output interacts with a STPCLK# feature on said processor.

13. A method for monitoring and controlling temperature of a processor having a clock and for modulating processor operations, comprising the steps of:
  sensing a temperature;
  producing a signal having a frequency related to temperature;
  comparing said frequency to a threshold frequency value; and
  if said frequency is at least said threshold frequency value, periodically asserting and deasserting a STPCLK# signal to a STPCLK# input of said processor thereby controlling the temperature of said processor.

14. A method for monitoring temperature of a processor having a clock and modulating processor operations, comprising the steps of:
  sensing a temperature;
  producing a signal having a frequency related to temperature;
  comparing said frequency to a threshold frequency value; and
  periodically asserting and deasserting, if said frequency is between a first frequency value and a second frequency value higher in frequency than said first frequency value, a STPCLK# signal to a STPCLK# input of said processor, at a first modulation level, and
  periodically asserting and deasserting, if said frequency is above said second frequency value, said STPCLK# signal to a STPCLK# input of said processor, at a second modulation level higher in level of modulation than said first modulation level.

* * * * *